Patented Jan. 26, 1932

1,842,733

UNITED STATES PATENT OFFICE

MARVIN C. REYNOLDS, OF OAK PARK, AND BENJAMIN R. HARRIS, OF CHICAGO, ILLINOIS

METHOD OF PACKING EGG CONTENT

No Drawing.   Application filed June 27, 1929.   Serial No. 374,271.

Our invention relates to certain new and useful improvements in the art of packing eggs, an object being to provide a method of packing egg content substantially free of admixed oxygen and foam and an improved product resulting therefrom.

In packing eggs, the egg shell is broken and the edible contents mixed and weighed, usually, into cans, which are subsequently placed in cold storage; or on breaking the eggs, the contents are separated into commercial yolks and whites and these two products are separately weighed into cans and stored at low cold storage temperatures.

In the case of the whole egg and commercial yolk products, mixing is desirable so as to produce a homogeneous product. Whole eggs contain about one third yolk and about two thirds white. Commercially separated yolks also contain a considerable amount of white material. The yolk and whites are of different composition, and different physical properties such as viscosity and do not readily mix with each other. In order to get a homogeneous product it is necessary to agitate and break up the yolk sac and mix the various egg constituents. On mixing, however, a considerable amount of air or other gas which may be present is incorporated and dispersed into the whites, forming a large amount of foam. The foam is a dispersion of the air or gas into water phase stabilized by the egg white albumins and proteins. Such mixed egg product will also contain foam. Particularly is mixing necessary, even in the case of egg whites, when modifying ingredients are added to alter the properties of the egg product. These modifying agents may be crystalloids such as sugars, salts, acids, or polyhydric alcohols or materials of various other kinds and sufficient agitation is necessary to dissolve them in the water of the egg material in the case of water soluble materials, or to emulsify or suspend them in the case of water insoluble materials.

For many purposes to which mixed egg yolks or whites are used, it is advisable to add some modifying agents which are either in liquid or in powdered form, and it is necessary to distribute said modifying agents uniformly. In the case of solid powders such as salts like sodium chloride, or dextrose, or cane sugar and their equivalents they usually contain adsorbed or occluded air. When such suitable powdered modifying agents are added to whole mixed eggs, commercial yolks, and whites, they introduce more air which increases the foam on mixing.

In all cases where agitation is employed, either for the purpose of homogeneously distributing added ingredients to the egg material or for the purpose of merely rendering the egg material homogeneous, varying amounts of air inadvertently are mixed into the egg material. This we have discovered is undesirable from two standpoints.

In the first place, the incorporated air tends to cause various kinds of deterioration due to the action of the oxygen, which is admixed with the egg material. In the second place, a certain amount of the incorporated air floats up to the surface and causes the formation of objectionable foam at the top of the contents of the container.

We obviate both of these disadvantages and any others, which the incorporation of air entails, by doing the mixing substantially in vacuo. Any suitable closed kettle equipped with an agitator and designed so that air may be pumped out of it is satisfactory for the purpose.

We do not desire to claim as part of our invention, any particular design of equipment, nor do we limit ourselves to any specific degree of evacuation. In practice, we employ a vacuum of about $28\frac{1}{2}''$. Generally speaking, the more complete the evacuation, the greater the advantages accruing from the use of our process.

In instances where comminuted solid materials are to be dissolved or dispersed in the egg material, it is preferable to exhaust the air mechanically enclosed among the solid particles by submitting them to evacuation prior to mixing. This may be done by first introducing the solid material into the mixing equipment, evacuating the apparatus and then introducing the egg material and agitating it. Or, if desired, the egg material may be introduced first into the mixing unit which is provided with a hopper which may be so constructed in relation to the mixing equipment that the dry material to be introduced into the egg substance is evacuated while in this hopper and subsequently introduced by a suitable valve into the evacuated mixing chamber.

An alternative method, although not as desirable as those described above, in instances where modifying ingredients are to be introduced into the egg material is to make a slight preliminary mixing under ordinary atmospheric conditions, then close the mixing equipment, evacuate and complete the mixing in vacuo.

The mixed products are then introduced into cans and either used directly or kept at low temperatures in cold storage or frozen to an immobile condition at sufficiently low temperature depending upon the composition of the product. Such can of egg material either modified, or not modified, with modifying agents, in a cold state, or in a frozen condition, or in a thawed out condition, being preliminarily frozen will contain less foam than if the egg material were mixed in the presence of air or gas.

An example of one way in which we practice our invention is as follows:

We introduce 270 lbs. of commercial yolk material and 30 lbs. of flake butter salt into the mixture. We close the apparatus and evacuate it to about 28½" to 29", which is easily possible within one minute with a pump of suitable capacity, and we then mix for three minutes.

Now we open the apparatus to the atmosphere and draw the material out through the bottom discharge. This gives a salt-treated yolk substantially free of admixed oxygen and substantially free of foam. This product may be used directly or it may be kept in cold storage until ready for use, at temperatures above freezing or frozen to an immobile state. It may then be removed from storage as desired for use, thawed out and poured or otherwise removed from the container.

Another example of the way in which we may practice our invention follows:

We introduce 200 lbs. of fine granulated cane sugar into the mixing machine, close it and evacuate it by means of a valve. We now shut off the evacuated mixing unit from the pump, thereby closing all inlets and outlets of the mixing unit. Through a suitably arranged valve we now suck in 100 lbs. of whites and shut off immediately after the whites are in so that no air is admitted into the apparatus. We now agitate until the sugar is dissolved, (if the egg whites are cold, the mixing unit should be provided with a warm water jacket). After the sugar is dissolved we open the apparatus to the atmosphere and withdraw the product. This gives a sugar treated egg white substantially free of foam and free of admixed air.

What we claim as new and desire to secure by United States Letters Patent is:—

1. The process of producing a frozen egg product which comprises adding to egg material a dry comminuted treating material, agitating the egg material and treating material together in a vacuum to produce a homogeneous mixture, running the mixture into containers, and freezing the mixture in the containers to produce a uniform frozen egg product substantially free of foam and entrapped air.

2. The process of producing a frozen egg product which comprises adding to egg material a modifying agent, agitating the egg material and treating material together in a vacuum to produce a homogeneous mixture, running the mixture into containers, and freezing the mixture in the containers to produce a uniform frozen egg product substantially free of foam and entrapped air.

3. The process of producing a frozen egg product which comprises adding sodium chloride to egg material, agitating the egg material and sodium chloride together in a vacuum to produce a homogeneous mixture, running the mixture into containers, and freezing the mixture in the containers to produce a uniform frozen egg product substantially free of foam and entrapped air.

In witness whereof we hereunto subscribe our names this 14th day of June, 1929.

MARVIN C. REYNOLDS.
BENJAMIN R. HARRIS.